UNITED STATES PATENT OFFICE.

RUDOLF SCHILLING, OF SCHÖNEBERG, GERMANY.

APPARATUS FOR CLARIFYING WASTE WATERS.

1,192,569.

Specification of Letters Patent.

Patented July 25, 1916.

Application filed March 5, 1912. Serial No. 681,793.

*To all whom it may concern:*

Be it known that I, RUDOLF SCHILLING, a subject of the German Emperor, and residing at Schöneberg, Germany, have invented certain new and useful Improvements in Apparatus for Clarifying Waste Waters, of which the following is a specification.

This invention has reference to an apparatus for separating out the floating and specially light suspended substances from waste waters.

According to the present invention the floating and suspended substances are removed from the top, whereas the waste waters containing the heavier substance are conducted away downward without any previous separation or depositing of the heavier substances, which are carried along by the escaping waters. This has been heretofore effected by increasing the flowing velocity of the escaping water by providing sloping and downwardly directed sliding surfaces comprising two vertically disposed cone-shaped members placed bottom to bottom and by drawing together the walls of the basin toward the outflow pipe which is placed adjacent the apex of the lower one of said cone-shaped members. By carrying the outflow pipe up sufficiently high any flowing away of the floating layer is prevented. Now it has been discovered that the flowing velocity of the escaping water can be sufficiently increased even without providing the downwardly directed sliding surfaces but merely by drawing together the walls of the basin toward the outflow spot of the water situated at the narrowest part of the lower portions of the basin.

Apparatus have already been described for clarifying waste waters which are also of basin shape and in which the walls are drawn together toward a deeply situated point. Generally speaking these apparatus require the flowing velocity of the water to be clarified to be decreased and not increased. Consequently with these apparatus the liquid enters at the narrowest spot and flows out at the broadest spot of the basin.

I shall now describe my invention with reference to the accompanying drawing which shows one form of execution of the basin according to the present invention, in which:—

Figure 1:
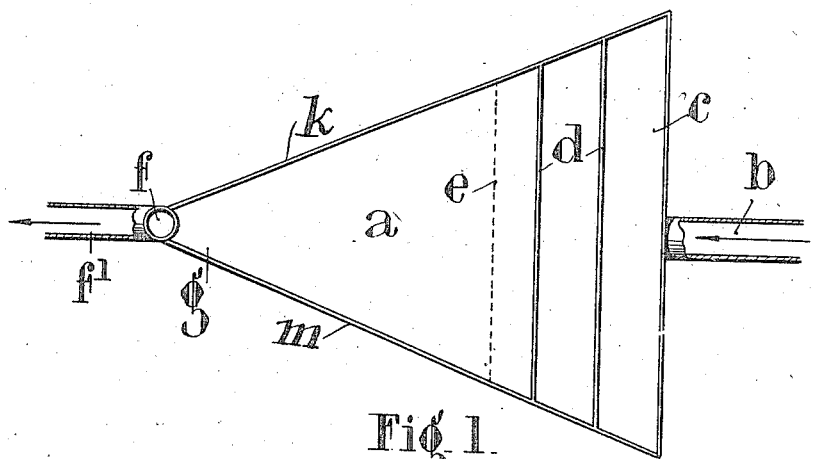
Figure 2:
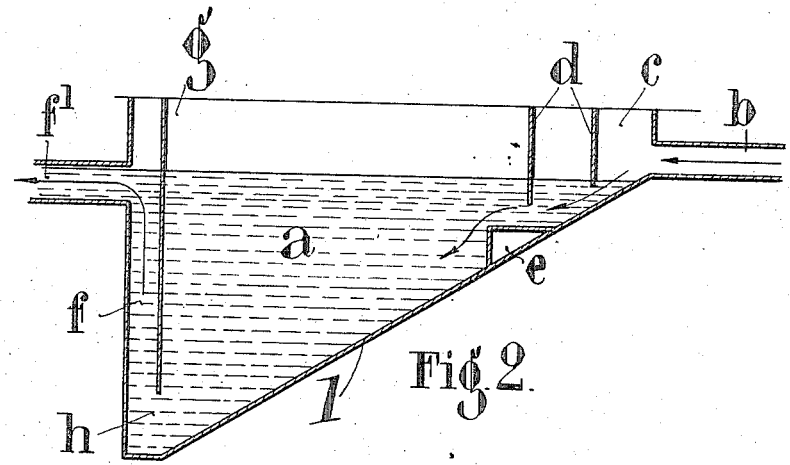

Figure 1 is a plan view; Fig. 2 is a section through one form of construction.

The separation out of the suspended materials is effected in a basin $a$ with a downwardly sloping bottom $l$ and vertical walls $k$ and $m$ attached thereto which converge toward each other to provide a basin which is relatively narrow and deep at one end $g$ and broad and shallow at the other end $c$. The waste waters flow into the basin, in the direction of the arrow at the broad end $c$ of the same, through the pipe or channel $b$. A number of buffer walls $d$ are arranged in the basin in front of the inlet opening and serve for stilling the inflowing waters in the known manner. The lower ends of the buffer walls are prolonged consecutively from the mouth of the inlet $b$ correspondingly to the slope of the bottom of the basin. Beneath the last buffer wall or just at the back of the same a step $e$ may be provided on the bottom of the basin, for the purpose of occasioning a sudden acceleration of the flowing velocity of the waste waters and of the heavy substances, although this step is not absolutely necessary for the intended method of working of the apparatus. The buffer walls arranged behind the inlet generally suffice for effecting the desired separating process in waste waters. The waste waters and heavy substances pass through the opening $h$ and rise up in the pipe $f$, flowing off at about the height of the inlet $b$.

In operation the waste waters passing into the basin $a$ through the inlet $b$ are first stilled by the buffer walls $d$ while at the same time there is a preliminary separating out of the floating and suspended substances. The floating and suspended substances are then separated out behind the last buffer wall and rise to the top. The waste waters and heavy substances, however, are gradually accelerated, for which a greater impulse can be obtained beforehand by falling down from a step $e$. The acceleration of the heavy substances constantly increased during the flowing away along the descending and narrowed bottom of the basin imparts to the heavy substances a moving energy which permits of their removal simultaneously with the exhaust water through the pipe $f$ without any previous precipitation or depositing. In order to reach the outflow opening the waste waters and heavy substances must rise up on the pipe $f$ to about the height of the inlet $b$ so that any disturbing or drawing away of the floating layer formed between the innermost buffer wall and the narrowed end of the basin $a$ is prevented.

I claim:

1. An apparatus for clarifying waste waters by separating out the floating matter and matter of light specific gravity, comprising a tank having a sloping bottom and converging side walls, said walls forming with said bottom a basin which is narrow and deep at one end and broad and shallow at the other end, an inlet conduit entering into the broad and shallow end of the basin above the level of the liquid contained in the tank, an outlet conduit in unrestricted communication with the narrow, deep end of the basin adjacent its bottom, said outlet conduit being of sufficiently small cross sectional area to cause the force of the liquid discharging therethrough from the basin to carry with it the heavier matter which sinks to the bottom of the basin, and baffle plates in said basin for reducing the surface flow of the liquid in the tank.

2. An apparatus for clarifying waste waters by separating out the floating matter and matter of light specific gravity, comprising a tank having a sloping bottom and converging side walls, said walls forming with said bottom a basin which is narrow and deep at one end and broad and shallow at the other end, an inlet conduit entering into the broad and shallow end of the basin above the level of the liquid contained in the tank, an outlet conduit in unrestricted communication with the narrow, deep end of the basin adjacent its bottom, said outlet conduit being of sufficiently small cross sectional area to cause the force of the liquid discharging therethrough from the basin to carry with it the heavier matter which sinks to the bottom of the basin and having its discharge opening at a level slightly below the level of the discharge through the inlet conduit, and baffle plates in said basin for reducing the surface flow of the liquid in the tank.

In testimony whereof, I affix my signature in the presence of two witnesses.

RUDOLF SCHILLING.

Witnesses:
 HENRY HASPER,
 WOLDEMAR HAUPT.